United States Patent [19]

McCready

[11] Patent Number: 4,891,405

[45] Date of Patent: Jan. 2, 1990

[54] MOLDABLE STYRENE-MALEIC ANHYDRIDE/POLYBUTYLENE TEREPHTHALATE COMPOSITION

[75] Inventor: Russell J. McCready, Downingtown, Pa.

[73] Assignee: ARCO Chemical Technology, Inc., Wilmington, Del.

[21] Appl. No.: 239,473

[22] Filed: Sep. 1, 1988

[51] Int. Cl.$^4$ .................. C08L 67/02; C08L 35/06
[52] U.S. Cl. ......................... 525/64; 525/166; 525/175; 525/176
[58] Field of Search .............. 525/64, 166, 176, 175

[56] References Cited

U.S. PATENT DOCUMENTS

| | | | |
|---|---|---|---|
| 3,644,574 | 2/1972 | Jackson et al. | 260/873 |
| 4,080,354 | 3/1978 | Kramer | 260/40 R |
| 4,217,427 | 8/1980 | Falk et al. | 525/176 |
| 4,701,493 | 10/1987 | Dean | 525/64 |

FOREIGN PATENT DOCUMENTS

| | | |
|---|---|---|
| 0257691 | 3/1988 | European Pat. Off. . |
| 0257692 | 3/1988 | European Pat. Off. . |
| 0257693 | 3/1988 | European Pat. Off. . |

*Primary Examiner*—Patricia Short
*Attorney, Agent, or Firm*—Dennis M. Kozak

[57] ABSTRACT

Moldable blends of styrene/maleic anhydride copolymer, polybutylene terephthalate ester, and styrene-maleimide copolymer having pendant carboxyl or hydroxyl groups are provided. In one embodimnent, the incorporation of the styrene-maleimide copolymer results in a composition having co-continuous phases. The compositions of this invention facilitate the production of blow molded articles.

24 Claims, No Drawings

MOLDABLE STYRENE-MALEIC ANHYDRIDE/POLYBUTYLENE TEREPHTHALATE COMPOSITION

This invention relates to improved molding compositions.

In one of its more specific aspects, this invention relates to molding compositions containing a styrene-maleic anhydride copolymer, a polybutylene terephthalate ester, and a minor amount of a styrene-maleimide copolymer having pendant carboxyl or hydroxyl groups.

Polymer blends of styrene-maleic anhydride copolymers (S/MA) and polybutylene terephthalate esters (PBT) are known from U.S. Pat. No. 3,644,574. Also known is a polymer mixture of PBT and a rubber modified styrene-maleic anhydride copolymer. This polymer mixture is described in EPA Publication No. 0 257 693. Molding compounds and films made from the polymer mixture are further described in EPA Publication Nos. 0 257 691 and 0 257 692, respectively.

U.S. Pat. No. 4,080,354 describes compositions of PBT with a second resinous component containing 1 to 40% vinyl aromatic units with the balance being non-aromatic units.

U.S. Pat. No. 4,217,427 describes PBT having incorporated thereinto pendant side chains of polystyrene to enhance its melt flow characteristics.

Notwithstanding the general knowledge that blends of S/MA and PBT are useful compositions, it is well known that their combination, using melt mixing in an extruder, results in molded products which delaminate due to the gross immiscibility of the polymers. This tendency toward delaminate has led the molding industry to continue to seek ways to combine these polymers attempting to obtain a composition which exhibits the high heat distortion temperature of the S/MA, the excellent solvent resistance of the PBT, and resistance to delamination.

The present invention provides compositions of S/MA and PBT in which the S/MA and PBT phases are co-continuous. Scanning electron microscopy has shown the compositions of this invention to be near interpenetrating-type morphology. As used herein, the term "co-continuous" in relation to polymer blends means a distribution of two polymers in a blend such that both polymers are present as continuous phases, i.e., neither polymer is identifiable as a dispersed phase in a continuous phase of the other polymer. The term is intended to include the transition area between separate dispersed phases and co-continuous phases. The present invention also provides improved molding compositions in which the S/MA and PBT are present as separate dispersed phases or which fall within the transition area between two separate and co-continuous phases.

The compositions of this invention are achieved by the incorporation of a minor amount of a styrene-maleimide copolymer having pendant carboxyl or hydroxyl groups into a blend of S/MA and PBT.

Molded products prepared from the compositions of this invention exhibit excellent deflection temperature under load, flexural modulus, unnotched impact strength, solvent resistance, and resistance to delamination According to this invention, there is provided a composition comprising:
(a) a styrene-maleic anhydride copolymer;
(b) a polybutylene terephthalate ester; and
(c) a styrene-maleimide copolymer having pendant carboxyl and hydroxyl groups, wherein the weight ratio of copolymer (a) to polyester (b) is from about 10:90 to about 90:10, and the amount of copolymer (c) in parts by weight is from about 1 to about 20 per each 100 total parts by weight of (a)+(b)+(c).

Also according to this invention, there is provided a method of producing a moldable composition which comprises blending a styrene-maleic anhydride copolymer, a polybutylene terephthalate ester, and a minor amount of a styrene-maleimide copolymer having pendant carboxyl or hydroxyl groups.

Molded products prepared from the above-described moldable compositions are also provided by this invention. One particularly unique feature of the moldable compositions of this invention is that they can be blow molded.

In a preferred embodiment of the invention, the weight ratio of S/MA copolymer to PBT is within the range of from about 60:40 to about 40:60, and the composition exhibits co-continuous S/MA and PBT phases.

Any suitable styrene-maleic anhydride copolymer can be used. The S/MA copolymer may be impact modified typically by the incorporation thereinto of a rubber. Preferably, the S/MA copolymer will contain from about 1 to about 25 weight percent maleic anhydride with the balance being styrene. If a rubber modified S/MA is employed, the rubber content will be 2 to 20 weight percent (add on) based on the total weight of the copolymer. If an impact modified S/MA copolymer is employed in a composition according to this invention, the rubber remains finely dispersed in the S/M phase of the composition. The number average molecular weight of the S/MA copolymer will be within the range of from about 50,000 to about 300,000. Suitable S/MA copolymers are available from ARCO Chemical Company under the trademark DYLARK.

The compositions of this invention will contain S/MA copolymer or impact modified S/MA copolymer or their mixtures in an amount within the range of from about 90 to about 10 weight percent, preferably, and in order to achieve co-continuous phases, from about 60 to about 40 weight percent, based on the total weight of the S/MA and PBT.

Any suitable PBT resin can be used. They are typically prepared by the condensation reaction of 1,4-butanediol and terephthalic acid.

The compositions of this invention will contain PBT in an amount within the range of from about 10 to about 90 weight percent, preferably, and in order to achieve co-continuous phases, from about 40 to about 60 weight percent, based on the total weight of the S/MA and the PBT.

The styrene-maleimide copolymer containing pendant carboxyl or hydroxyl groups is not known to be commercially available.

Accordingly, Examples 1-5 describe the preparation of styrene-maleimide copolymers suitable for use in this invention.

Generally, the procedure for producing the styrene-maleimide copolymer with pendant groups involves the modification of a styrene-maleic anhydride copolymer (DYLARK ® resin) with an amino acid or ester (e.g., p-aminobenzoic acid, ethyl p-aminobenzoate, methyl p-aminobenzoate, dimethyl aminoisophthalate, dimethyl aminoterephthalate, p-aminophenol, or glycine)

by refluxing with azeotropic removal of water in a solvent.

The styrene-maleimide copolymer containing pendant carboxyl or hydroxyl groups will be employed in an amount of from about 1 to about 20 parts by weight, preferably from about 8 to about 12 parts by weight, for each 100 parts by weight of total S/MA, PBT, and styrene-maleimide copolymer. The styrene-maleimide copolymer functions as an interfacial modifier between the S/MA and PBT phases.

The following examples will serve to further demonstrate the invention. Examples 1-5 demonstrate the preparation of styrene-maleimide copolymer having pendant carboxyl or hydroxyl groups.

Examples 6-18 demonstrate the preparation of moldable compositions of this invention and their properties in molded form.

Example 19 describes the preparation of a blow molded article.

EXAMPLE 1

About 600 g. of a styrene-maleic anhydride copolymer containing 14% maleic anhydride (DYLARK ®332 resin) and about 62 g of glycine were mixed and then refluxed in about 1400 g of a 70:30 (by weight) solvent mixture of xylene and dimethylformamide. After azeotropic removal of about 15 ml. of water, the solution was poured into a pan, and the solvent mixture was evaporated in a vacuum oven at 60° C. The resultant polymer—a styrene-maleimide copolymer with pendant carboxyl groups—was finely ground and placed in a vacuum oven to remove residual solvent. The total product recovered weight 590 g. (91.5% yield) and had a Tg of 152° C.

EXAMPLE 2

About 500 g. of a styrene-maleic anhydride copolymer containing 14% maleic anhydride (DYLARK ®332 resin) and about 47.8 g of hydroxylamine-HCl were mixed and then refluxed in about 1400 g of a 70:30 (by weight) solvent mixture of xylene and dimethylformamide. After azeotropic removal of about 12 ml. of water, the solution was poured into a pan, and the solvent mixture was evaporated in a vacuum oven at 60° C. The resultant polymer—a styrene-maleimide copolymer with pendant hydroxyl groups—was finely ground and placed in a vacuum oven to remove residual solvent. The total product recovered weight 514 g. (96.0% yield) and had a Tg of 114° C.

EXAMPLE 3

About 500 g. of a styrene-maleic anhydride copolymer containing 14% maleic anhydride (DYLARK ®332 resin) and about 113.7 g of ethyl p-aminobenzoate were mixed and then refluxed in about 1400 g of a 70:30 (by weight) solvent mixture of xylene and dimethylformamide. After azeotropic removal of about 12 ml. of water, the solution was poured into a pan, and the solvent mixture was evaporated in a vacuum oven at 60° C. The resultant polymer—a styrene-maleimide copolymer with pendant carboxyl groups—was finely ground and placed in a vacuum oven to remove residual solvent. The total product recovered weight 569 g. (94.5% yield) and had a Tg of 136° C.

EXAMPLE 4

About 500 g. of a styrene-maleic anhydride copolymer containing 14% maleic anhydride (DYLARK ®332 resin) and about 75 g of p-aminophenol were mixed and then refluxed in about 1400 g of a 70:30 (by weight) solvent mixture of xylene and dimethylformamide. After azeotropic removal of about 12 ml. of water, the solution was poured into a pan, and the solvent mixture was evaporated in a vacuum oven at 60° C. The resultant polymer—a styrene-maleimide copolymer with pendant hydroxyl (phenolic)

groups—was finely ground and placed in a vacuum oven to remove residual solvent. The total product recovered weight 546 g. (97% yield) and had a Tg of 159° C.

EXAMPLE 5

About 500 g. of a styrene-maleic anhydride copolymer containing 14% maleic anhydride (DYLARK ®332 resin) and about 94.4 g of p-aminobenzoic acid were mixed and then refluxed in about 1400 g of a 70:30 (by weight) solvent mixture of xylene and dimethylformamide. After azeotropic removal of about 12.2 ml. of water, the solution was poured into a pan, and the solvent mixture was evaporated in a vacuum oven at 60° C. The resultant polymer—a styrene-maleimide copolymer with pendant carboxyl groups—was finely ground and placed in a vacuum oven to remove residual solvent. The total product recovered weight 546 g. (93.8% yield) and had a Tg of 167° C.

EXAMPLES 6-10

The physical properties obtained from a series of five molded compositions of the invention are shown in following Table I. Each composition contained 10 parts by weight of the styrene-maleimide copolymer containing pendant carboxyl groups prepared in Example 5.

Each of the five molding compositions was prepared by blending the designated amounts of materials in a Sterling extruder (1 in., 36:1 L/D) at a 480° F. profile (melt temperature 75° F.). After extrusion, each composition was pelletized and dried at about 200° F. The pellets were molded into ASTM test samples on a Battenfeld injection molding machine at 465° F. profile and 140° F. mold temperature. 475° F.). After extrusion, each composition was pelletized and dried at about 200° F. The pellets were molded into ASTM test samples on a Battenfeld injection molding machine at 465° F. profile and 140° F. mold temperature.

TABLE I

| PHYSICAL PROPERTIES OF MOLDED COMPOSITIONS OF THE INVENTION (EXAMPLES 6-10) | | | | | |
|---|---|---|---|---|---|
| Example No. | 6 | 7 | 8 | 9 | 10 |
| Materials (Parts by Weight) | | | | | |
| S/MA (DYLARK 332) | 81 | 72 | 63 | 45 | 9 |
| PBT | 9 | 18 | 27 | 45 | 81 |
| S/MI Copolymer of Ex. 5 | 10 | 10 | 10 | 10 | 10 |
| Physical Property | | | | | |
| Flex. Modulus ($\times 10^3$, psi)[1] | 514 | 509 | 491 | 458 | 395 |
| Tensile Strength (psi)[2] | 6200 | 6600 | 7600 | 7800 | 7700 |
| Tensile Elongation (%)[2] | 2.4 | 2.5 | 2.8 | 3.1 | 15.0 |
| Unnotched Izod (ft-lbs/in)[3] | 2.0 | 2.6 | 2.8 | 4.3 | 16.8 |
| Deflection Temp. under Load (°F.)[4] | 219 | 218 | 217 | 220 | 152 |

[1] ASTM D-790
[2] ASTM D-638
[3] ASTM D-256
[4] ASTM D-648

The physical property data in Table I demonstrate that molded compositions of this invention achieve the beneficial combination of component physical properties, i.e., the heat distortion of the styrene-maleic anhydride copolymer and the impact strength of the polybutylene terephthalate ester. Moreover, all molded samples were visually inspected and showed no delamination. The composition of Example 9 exhibited co-continuous phases of S/MA and PBT.

EXAMPLES 11-18

Using substantially the procedure set forth in Examples 6-10, a second series of eight molding compositions of the invention was prepared, molded, and tested to determine physical properties and solvent resistance. The styrene-maleimide copolymer employed in all eight compositions was the styrene-maleimide copolymer containing pendant carboxyl groups prepared in Example 1. The physical properties of Examples 10-18 are shown in following Table II.

Also shown in Table II are the solvent resistance data obtained on Examples Nos. 11, 12, 14, 17, and 18 (Examples 13, 15, and 16 were not subjected to solvent testing).

The solvent resistance data were obtained by submersing ASTM D-368 type V tensile bars molded from each of the five compositions and the control samples in the designated solvents for three days at room temperature (25° C.). Before tensile strength testing, all submersed bars were allowed to set for one day.

chloride. No delamination of the molded compositions was observed.

EXAMPLE 19

The moldable composition of Example 15 is blow molded on an Impco B13 blow molding machine into a 10-inch long hourglass-shaped article having a major diameter of about 4 inches. The following approximate blow molding conditions are used:
Rear Zone Temp. (°F.): 420–440
Front Zone Temp. (°F.): 410–430
Die Head Temp. (°F.): 420–460
Blow Time (sec.): 20–60
Exhaust (sec.): 1–5
Parison Drop Time (sec.): 1–3
Blow Pressure (psi): 40 –80

It will be evident from the foregoing that various modifications can be made to this invention. Such, however, are considered as being within the scope of the invention.

What is claimed is:

1. A moldable composition comprising:
   (a) a styrene-maleic anhydride copolymer;
   (b) a polybutylene terephthalate ester; and
   (c) a styrene-maleimide copolymer having pendant carboxyl or hydroxyl groups, wherein the weight ratio of copolymer (a) to polyester (b) is from about 90:10 to about 10:90, and the amount of copolymer (c) in parts by weight is from about 1 to about 20 parts per each 100 parts by weight of total (a) +(b) +(c).

2. The composition of claim 1 in which said styrene-maleic anhydride copolymer contains from about 1 to about 25 weight percent maleic anhydride.

3. The composition of claim 1 in which said styrene-maleic anhydride copolymer is an impact modified styrene-maleic anhydride copolymer.

4. The composition of claim 3 in which said styrene-maleic anhydride copolymer is impact modified by the incorporation of a rubber.

TABLE II

| PHYSICAL PROPERTIES AND SOLVENT RESISTANCE OF MOLDED COMPOSITIONS OF THE INVENTION (EXAMPLES 11-18) | | | | | | | | | | |
|---|---|---|---|---|---|---|---|---|---|---|
| Example No. | Control | 11 | 12 | 13 | 14 | 15 | 16 | 17 | 18 | Control |
| Materials (Parts by Weight) | | | | | | | | | | |
| S/MA (DYLARK 332) | 100.0 | 85.5 | 76.0 | 54.0 | 50.0 | 47.5 | 36.0 | 19.0 | 9.5 | 0.0 |
| PBT | 0.0 | 9.5 | 19.0 | 36.0 | 40.0 | 47.5 | 54.0 | 76.0 | 85.5 | 100.0 |
| Copolymer of Ex. 1 | 0.0 | 5.0 | 5.0 | 10.0 | 10.0 | 5.0 | 10.0 | 5.0 | 5.0 | 0.0 |
| Physical Property | | | | | | | | | | |
| Flex. Modulus ($\times 10^3$, psi)[1] | 485 | 476 | 463 | 434 | 407 | 415 | 406 | 376 | 365 | 317 |
| Tensile Strength (psi)[2] | 8800 | 6900 | 6200 | 7900 | 8200 | 8700 | 8600 | 7800 | 7300 | 7800 |
| Tensile Elongation (%)[2] | 2.5 | 3.8 | 3.4 | 3.2 | 3.2 | 3.7 | 3.9 | 13.0 | 84.0 | 309 |
| Unnotched Izod (ft-lbs/in)[3] | 1.6 | 1.4 | 1.7 | 2.4 | 3.1 | 3.0 | 3.2 | 8.9 | 12.9 | 32.0 |
| Deflection Temp. under Load (°F.)[4] | 218 | 219 | 217 | 216 | 209 | 208 | 201 | 162 | 141 | 130 |
| Solvent Resistance (Tensile Strength (psi)[2] | | | | | | | | | | |
| Solvent Used: | | | | | | | | | | |
| None (Control) | 8800 | 6900 | 6200 | — | 8200 | — | — | 7800 | 7300 | 7800 |
| Methanol | 6200 | 6145 | 6145 | — | 8120 | — | — | 7870 | 7740 | 7300 |
| Toluene | DIS[5] | DIS | DIS | — | 2070 | — | — | 7120 | 7200 | 6850 |
| Methylene Chloride | DIS | DIS | DIS | — | 3330 | — | — | 3620 | 5760 | 8140 |

[1]ASTM D-790
[2]ASTM D-638
[3]ASTM D-256
[4]ASTM D-648
[5]DIS = sample dissolved The compositions of Examples 11, 12, 17, and 18 exhibited separate dispersed phases of S/MA and PBT.

The compositions of Examples 13, 14, 15, and 16 all exhibited co-continuous morphology. Examples 14 and 15 were co-continuous, whereas Examples 13 and 16 containing 60:40 and 40:60 weight ratios of S/MA to PBT respectively exhibited substantially co-continuous phases, i.e., they fall within the transition area between separate dispersed phases and co-continuous phases.

The solvent resistance data in Table II show that the incorporation of minor amounts of a styrene-maleimide copolymer bearing pendant carboxyl groups into a blend of S/MA and PBT serves to significantly enhance the ability of the blend to retain its tensile strength property value after being immersed in solvent. The excellent resistance to solvents possessed by the compositions of this invention is observed even with methylene 5. The composition of claim 1 in which said weight ratio of copolymer (a) to polyester (b) is from about 60:40 to about 40:60.

6. The composition of claim 1 in which said amount of copolymer (c) in parts by weight is from about 8 to about 12 per each 100 parts by weight of total (a)+(b)+(c).

7. The composition of claim 1 in which said styrene-maleic anhydride copolymer has a number average molecular weight within the range of from about 50,000 to about 300,000.

8. A moldable composition comprising:
(a) a styrene-maleic anhydride copolymer having a number average molecular weight within the range of from about 50,000 to about 300,000;
(b) a polybutylene terephthalate ester; and
(c) a styrene-maleimide copolymer having pendant carboxyl or hydroxyl groups, wherein the weight ratio of copolymer (a) to polyester (b) is from about 60:40 to about 40:60, and the amount of copolymer (c) in parts by weight is from about 8 to about 12 parts per each 100 parts by Weight of total (a)+(b)+(c), and wherein copolymer (a) and polyester (b) are present in the composition as co-continuous phases.

9. The composition of claim 8 in which said styrene-maleic anhydride copolymer is an impact modified styrene-maleic anhydride copolymer.

10. A molded article produced by molding a composition comprising:
(a) a styrene-maleic anhydride copolymer;
(b) a polybutylene terephthalate ester; and
(c) a styrene-maleimide copolymer having pendant carboxyl or hydroxyl groups, wherein the weight ratio of copolymer (a) to polyester (b) is from about 90:10 to about 10:90, and the amount of copolymer (c) in parts by weight is from about 1 to about 20 parts per each 100 parts of total (a)+(b)+(c).

11. The molded article of claim 10 being a blow molded article produced by blow molding said, composition.

12. The molded article of claim 10 in which said styrene-maleic anhydride copolymer contains from about 1 to about 25 weight percent maleic anhydride.

13. The molded article of claim 10 in which said styrene-maleic anhydride copolymer is an impact modified styrene-maleic anhydride copolymer.

14. The molded article of claim 13 in which said styrene-maleic anhydride copolymer is impact modified by the incorporation of a rubber.

15. The molded article of claim 10 in which said weight ratio of copolymer (a) to polyester (b) is from about 60:40 to about 40:60.

16. The molded article of claim 10 in which said copolymer (c) in parts by weight is from about 8 to about 12 per each 100 parts by weight of total (a)+(b)+(c).

17. The molded article of claim 10 in which said anhydride copolymer has a number average molecular weight within the range of from about 50,000 to about 300,000.

18. A molded article produced by molding a composition having two co-continuous phases comprising:
(a) a styrene-maleic anhydride copolymer having a number average molecular weight within the range of from about 50,000 to about 300,000;
(b) a polybutylene terephthalate ester; and
(c) a styrene-maleimide copolymer having pendant carboxyl or hydroxyl groups, wherein the weight ratio of copolymer (a) to polyester (b) is from about 60:40 to about 40:60, and the amount of copolymer (c) in parts by weight is from about 8 to about 12 parts per each 100 parts by weight of total (a)+(b)+(c), and wherein copolymer (a) and polyester (b) are present in the composition as co-continuous phases.

19. The article of claim 18 being a blow molded article produced by blow molding said composition.

20. A molded composition comprising a first continuous phase, a second continuous phase, and an interface, wherein the first continuous phase comprises styrene-maleic anhydride copolymer, the second continuous phase comprises polybutylene terephthalate, and the interface comprises a styrene-maleimide copolymer having pendant carboxyl or hydroxyl groups.

21. The molded composition of claim 20 in which said styrene-maleic anhydride is impact modified.

22. The molded composition of claim 20 in which the weight ratio of styrene-maleic anhydride copolymer to polybutylene terephthalate is from about 60:40 to about 40:60.

23. The molded composition of claim 20 in which said interface copolymer is present in an amount of from about 1 to about 20 parts by weight per each 100 parts by weight of the total composition, including the interface copolymer.

24. The molded composition of claim 20 in which said styrene-maleic anhydride copolymer has a number average molecular weight within the range of from about 50,000 to about 300,000 and contains from about 1 to about 25 weight percent maleic anhydride.

* * * * *